(12) United States Patent
Kim

(10) Patent No.: US 11,292,306 B2
(45) Date of Patent: Apr. 5, 2022

(54) HYDRAULIC MOUNT FOR VEHICLES

(71) Applicants: HYUNDAI MOTOR COMPANY, Seoul (KR); KIA MOTORS CORPORATION, Seoul (KR)

(72) Inventor: Seung Won Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 73 days.

(21) Appl. No.: 16/983,149

(22) Filed: Aug. 3, 2020

(65) Prior Publication Data

US 2021/0061039 A1 Mar. 4, 2021

(30) Foreign Application Priority Data

Sep. 3, 2019 (KR) .......................... 10-2019-0108561

(51) Int. Cl.
*F16F 13/04* (2006.01)
*B60G 13/00* (2006.01)
*B60G 13/08* (2006.01)

(52) U.S. Cl.
CPC .......... *B60G 13/003* (2013.01); *B60G 13/08* (2013.01); *B60G 2202/24* (2013.01); *B60G 2204/128* (2013.01); *B60G 2204/41* (2013.01); *B60G 2206/73* (2013.01); *B60G 2206/8207* (2013.01)

(58) Field of Classification Search
CPC .... B60G 13/003; B60G 13/08; B60K 5/1208; B60K 5/1275; B60K 5/1283; F16F 13/04; F16F 13/26

USPC ........................................ 267/140.11–140.15
See application file for complete search history.

(56) References Cited

U.S. PATENT DOCUMENTS

| 2016/0238103 | A1* | 8/2016 | Kim ..................... B60K 5/1208 |
| 2017/0313171 | A1* | 11/2017 | Yoon ....................... F16F 13/08 |
| 2018/0148104 | A1* | 5/2018 | Baluch ................ B60K 5/1208 |
| 2018/0162211 | A1* | 6/2018 | Kim ..................... B60K 5/1283 |

FOREIGN PATENT DOCUMENTS

| JP | 2003-214482 A | 7/2003 |
| JP | 2004-263783 A | 9/2004 |
| JP | 4126597 B2 | 7/2008 |
| JP | 2009-002426 A | 1/2009 |
| KR | 10-2014-0069838 A | 6/2014 |
| KR | 10-1499211 B1 | 3/2015 |
| KR | 101610481 B1 * | 4/2016 | ............. F16F 15/02 |

* cited by examiner

*Primary Examiner* — Christopher P Schwartz
(74) *Attorney, Agent, or Firm* — Lempia Summerfield Katz LLC

(57) ABSTRACT

A hydraulic mount for a vehicle having both forward-rearward damper and upward-downward damper includes: a main rubber configured to define a fluid chamber; an orifice assembly that divides the fluid chamber into an upper fluid chamber and a lower fluid chamber, defines the upper fluid chamber together with the main rubber, and has an orifice arranged between the upper fluid chamber and the lower fluid chamber; and a diaphragm configured to define the lower fluid chamber at the lower side of the orifice assembly. In particular, the main rubber has a partition wall extending downwards so as to partition the upper fluid chamber into a first upper fluid chamber and a second upper fluid chamber in the state in which the lower end of the partition wall is coupled to the orifice assembly.

11 Claims, 10 Drawing Sheets

HYDRAULIC MOUNT FOR VEHICLES

CROSS-REFERENCE TO RELATED APPLICATION

This application claims priority to and the benefit of Korean Patent Application No. 10-2019-0108561, filed on Sep. 3, 2019, the entire contents of which are incorporated herein by reference.

FIELD

The present disclosure relates to a hydraulic mount for vehicles.

BACKGROUND

The statements in this section merely provide background information related to the present disclosure and may not constitute prior art.

In the vehicle industry, vehicles have been recently developed based on high output of an engine and a reduction in weight of a chassis thereof due to environmental regulations and demand for improvement in fuel economy in a high oil price age.

Since the weight of the chassis of the vehicle is further reduced while noise and vibration of the engine increase, however, great noise and vibration are generated in the vehicle even due to a small excitation source.

In addition, effort have been continuously made to analyze noise, vibration, and impact in the vehicle in order to maximize ride comfort due to gradual growth in technology applied to the vehicle and increased consumer demand for low noise and vibration.

Vibration of the engine generated at a specific RPM (revolutions per minute) range during traveling of the vehicle is transmitted to the interior of the vehicle at a specific frequency via the chassis of the vehicle, and at this time the explosion component of the engine has a great influence on the interior of the vehicle.

In a structural aspect, vibration is constantly generated in the engine of the vehicle due to a periodic change in the central position thereof caused by upward-downward movement of a piston and a connecting rod, inertial force of a reciprocating portion acting in the axial direction of a cylinder, inertial force generated when the connecting rod shakes to the left and right of a crank shaft, and a periodic change in rotational force applied to the crank shaft.

Consequently, an engine mount for supporting the engine and reducing noise and vibration transmitted from the engine is mounted between the engine and the chassis of the vehicle.

The engine mount serves to support a powertrain including the engine and to isolate excitation force transmitted from the engine to the chassis of the vehicle in order to damp noise and vibration, thereby improving ride comfort.

The engine mount is generally classified as a rubber type engine mount, an air damping engine mount, or a fluid-filled engine mount.

In the initial stage, the rubber type engine mount, i.e. a simple rubber type mount, has mainly been used. In recent years, however, the fluid-filled engine mount, in which a fluid is filled in order to improve damping characteristics, has been developed and used.

The rubber type engine mount, in which a rubber material is used, is very weak to low-frequency, large-displacement vibration and does not sufficiently satisfy damping performance for high-frequency, small-displacement vibration and low-frequency, large-displacement vibration.

Consequently, the fluid-filled engine mount, which is capable of absorbing and damping vibration over a wide area, including high-frequency, small-displacement vibration and low-frequency, large-displacement vibration, input to the engine mount according to the operation of the engine, has been widely used.

The fluid-filled engine mount is also called a hydraulic mount or a hydro-mount, and has a structure in which damping force is generated as a fluid filled under a main rubber (an insulator) flows through a channel between an upper fluid chamber and a lower fluid chamber, and is capable of damping both high-frequency vibration (small-displacement vibration) and low-frequency vibration (large-displacement vibration) depending on circumstances.

In the fluid-filled engine mount, as described above, a hydraulic system is applied to control the behavior of the powertrain during traveling of the vehicle in order to exhibit damping characteristics, and is applied in order to control upward-downward behavior of the powertrain. Consequently, the fluid-filled engine mount generally has a structure having upward-downward damping characteristics.

In a lateral mounting scheme, in which the powertrain is disposed so as to cross the chassis of the vehicle in the lateral direction, an inertial support scheme, which is widely applied to front wheel drive type vehicles, insulation characteristics of the mount in the forward-rearward direction thereof are important above all.

The reason for this is that the rotational direction of the powertrain is the forward-rearward direction of the mount. Consequently, concern about the insulation characteristics and damping in the forward-rearward direction has gradually increased, and a dual orifice structure has been developed in recent years.

In a three-point inertial support scheme, great force is applied in the forward-rearward direction when an engine torque load is applied, and therefore it is necessary to solve an NVH (noise, vibration, and harshness) problem through forward-rearward damping.

In order to have a forward-rearward direction and upward-downward damping structure, a general conical mount must have two orifice devices, and a radial main rubber (insulator) must be used, whereby forward-rearward characteristics of the main rubber increase.

Consequently, the mount capable of performing the forward-rearward direction and upward-downward damping cannot be used in a general three-point inertial support scheme and is used in only a composite support scheme of a system having a low load burden.

As is generally known, a general hydraulic mount includes two fluid chambers (an upper fluid chamber and a lower fluid chamber) disposed in the upward-downward direction and an orifice assembly disposed between the two fluid chambers, whereby a damping action is performed only for upward-downward behavior of the powertrain (i.e. the engine).

Also, in the case in which both upward-downward damping and forward-rearward damping are desired, a radial (X-shaped) main rubber and two orifice assemblies must be provided in order to constitute a total of four fluid chambers.

As described above, the known hydraulic mount exhibits both upward-downward damping characteristics and forward-rearward damping characteristics using the X-shaped main rubber. We have discovered that forward-rearward characteristics of the main rubber increase, while an insulation rate is deteriorated.

In addition, we have found that since the known hydraulic mount exhibiting both upward-downward damping characteristics and forward-rearward damping characteristics includes the X-shaped main rubber and the two orifice assemblies, the shape and structure of the main rubber (insulator) and the overall construction of the mount are more complicated than a general hydraulic mount exhibiting only upward-downward damping characteristics, whereby robustness and durability are deteriorated and fluid leakage may occur.

In addition, the two orifice assemblies are provided, whereby the structure of the mount is complicated. Consequently, cost and weight of the mount increase.

The above information disclosed in this Background section is provided only for enhancement of understanding of the background of the present disclosure and therefore it may contain information that does not form the prior art that is already known to a person of ordinary skill in the art.

SUMMARY

The present disclosure provides a hydraulic mount for vehicles having both forward-rearward damping performance and upward-downward damping performance while having a simple construction.

The objects of the present disclosure are not limited to those described above. The objects of the present disclosure will be clearly understood from the following description and could be implemented by means defined in the claims and a combination thereof.

In one aspect of the present disclosure, a hydraulic mount for vehicles includes: a main rubber configured to define a fluid chamber, an orifice assembly configured to partition the fluid chamber into an upper fluid chamber and a lower fluid chamber, to define the upper fluid chamber together with the main rubber, and to have an orifice, which is a fluid passage, disposed between the upper fluid chamber and the lower fluid chamber, and a diaphragm configured to define the lower fluid chamber on the lower side of the orifice assembly, wherein the main rubber has a partition wall extending downwards so as to partition the upper fluid chamber into a first upper fluid chamber and a second upper fluid chamber in the state in which the lower end of the partition wall is coupled to the orifice assembly.

The first upper fluid chamber is located at a front of the vehicle in a direction of a chassis of the vehicle, and the second upper fluid chamber is located at a rear of the vehicle in the direction of the chassis of the vehicle.

The partition wall of the main rubber may be formed in a shape extending downwards from the middle of the lower surface of the main rubber defining the upper fluid chamber such that the lower end of the partition wall is coupled to the upper surface of the orifice assembly.

A coupling unit is formed at an upper plate of the orifice assembly and configured to extend in a diametrical direction of the upper plate, the lower end of the partition wall of the main rubber is coupled to the coupling unit, and the lower end of the partition wall may be formed in a shape extending in the diametrical direction of the upper plate so as to be coupled to the coupling unit of the upper plate.

The coupling unit may include two elongated protrusions formed at the upper plate so as to be disposed in parallel such that the lower end of the partition wall is inserted and coupled between the two protrusions.

A coupling unit, to which the lower end of the partition wall of the main rubber is coupled, may be formed at the upper plate of the orifice assembly, the coupling unit may include two elongated protrusions formed at the upper plate, and the two elongated protrusions are disposed in parallel with each other. In particular, the lower end of the partition wall may be inserted and coupled between the two elongated protrusions.

A fastening member configured to be inserted between the two protrusions may be installed at the lower end of the partition wall, and a rivet pin formed at the fastening member may be riveted in the state of being inserted through a rivet hole formed in the upper plate, whereby the lower end of the partition wall may be integrally fixed to the upper plate via the fastening member.

The orifice assembly may have a first orifice, which is a fluid passage between the first upper fluid chamber and the lower fluid chamber, and a second orifice, which is a fluid passage between the second upper fluid chamber and the lower fluid chamber.

The orifice assembly may include an upper plate and a lower plate defining orifices, which are fluid passages, the first orifice and the second orifice may be provided between the upper plate and a lower plate, each of the first orifice and the second orifice being semicircular, fluid passage holes through which the first orifice and the second orifice communicate respectively with the first upper fluid chamber and the second upper fluid chamber may be formed in the upper plate, and fluid passage holes through which the first orifice and the second orifice communicate with the lower fluid chamber may be formed in the lower plate.

Other exemplary forms of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
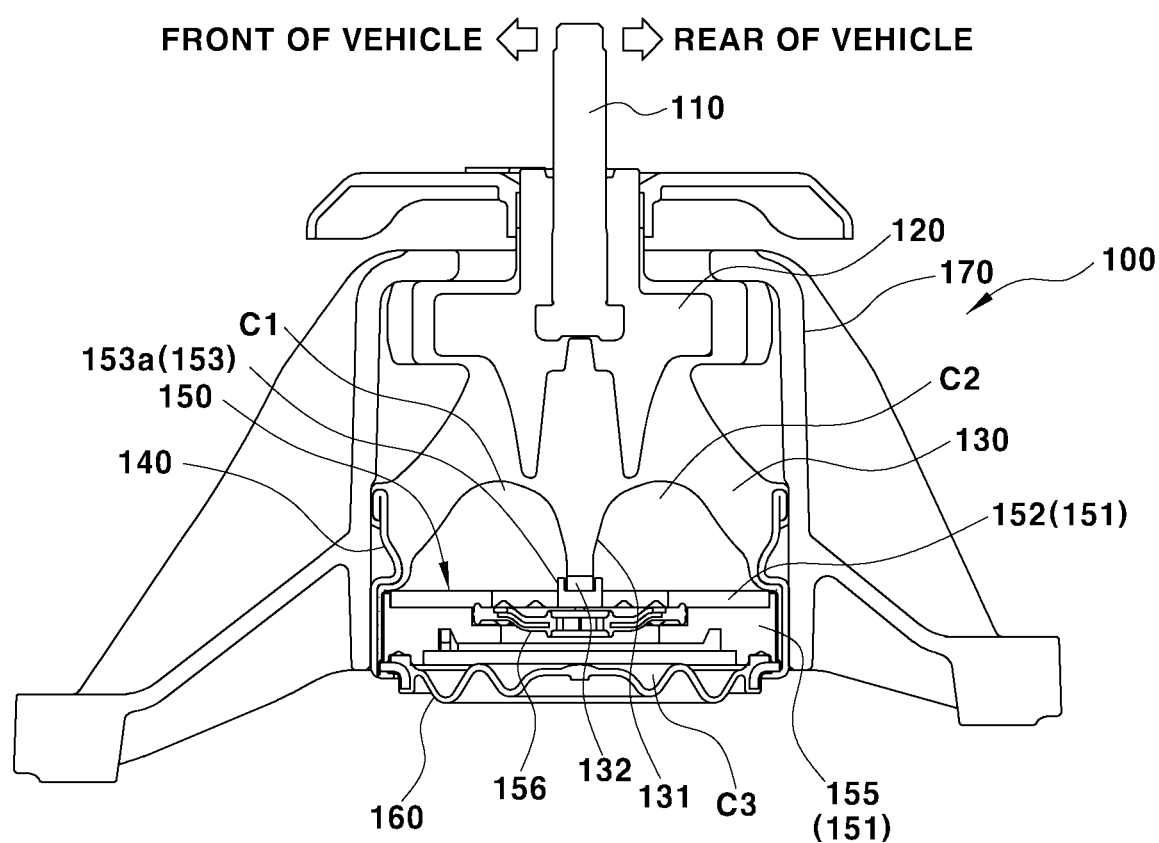
FIG. 1 is a sectional view showing a mount in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to various forms of the present disclosure, examples of which are illustrated in the accompanying drawings and described below.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, will be determined in part by the particular intended application and use environment.

The term "comprises" or "includes" described herein should be interpreted not to exclude other elements but to further include such other elements unless mentioned otherwise.

The present disclosure relates to a hydraulic mount for vehicles, and more particularly to a fluid-filled engine mount for supporting an engine of a vehicle.

In addition, the present disclosure relates to a hydraulic mount for vehicles capable of performing both forward-rearward damping and upward-downward damping through a simple structure.

In one form of the present disclosure, the hydraulic mount for vehicles exhibits both forward-rearward damping performance and upward-downward damping performance using only a single orifice assembly through simple improvement of the internal structure of a general conical hydraulic mount.

FIG. 1 is a sectional view showing a mount in one form of the present disclosure.

First, unlike a conventional hydraulic mount having a radial (X-shaped) main rubber (insulator) and two orifice assemblies in order to exhibit both forward-rearward damping performance and upward-downward damping performance, the mount 100 according to one form of the present disclosure has a single orifice assembly 150, like a general hydraulic mount (a mount exhibiting only upward-downward damping performance), and a main rubber 130 also has a shape similar to that of the general hydraulic mount.

However, the mount 100 is different from the conventional hydraulic mount in that a partition wall 131 for partitioning an upper fluid chamber into two fluid chambers C1 and C2 is further formed at the main rubber 130.

A fluid chamber of the mount 100, which is filled with a fluid, has a construction similar to that of a conventional fluid chamber defined by a main rubber, an orifice assembly, and a diaphragm of the conventional hydraulic mount.

The mount 100 is different from the general hydraulic mount in that the upper fluid chamber is partitioned into two fluid chambers C1 and C2 by the partition wall 131 of the main rubber 130 although the upper fluid chamber and a lower fluid chamber are utilized without change.

The mount 100 may include a center bolt 110 fastened to an engine, an inner core 120, to which the center bolt 110 is coupled, and a main rubber (or an insulator) 130 formed so as to be integrally coupled to the inner core 120.

In one form, the main rubber 130 fixes and supports the inner core 120, and defines the upper fluid chamber C1 and C2 together with an orifice assembly 150 disposed at the lower side thereof.

An outer pipe 140 is coupled to the lower part of the main rubber 130. After the inner core 120 is manufactured in the state in which the center bolt 110 is installed, the inner core 120 and the outer pipe 140 may be mounted in a mold, and then the main rubber 130, which is integrally coupled to the inner core 120 and the outer pipe 140, may be formed through a curing process.

In addition, the orifice assembly 150 includes an orifice plate 151, and may further include a membrane 156.

The orifice plate 151 is installed in the horizontal direction so as to partition a fluid chamber in the mount into the upper fluid chamber C1 and C2 and a lower fluid chamber C3 at the lower side of the main rubber 130 in the mount 100, and may include an upper plate 152 and a lower plate 155.

The orifice plate 151 has orifices 157 and 158 defining a ring-shaped detour channel (also referred to as an inertia track) for guiding the flow of fluids between the upper fluid chamber C1 and C2 and the lower fluid chamber C3.

A diaphragm 160 is installed at the lower side of the orifice plate 151, and the orifice plate 151 and the diaphragm 160 define the lower fluid chamber C3.

In addition, fluid passage holes 152a (see FIG. 4), through which the orifices 157 and 158 communicate with the upper fluid chamber C1 and C2, are formed in the upper plate 152 of the orifice plate 151, and fluid passage holes 155a (see FIG. 4), through which the orifices 157 and 158 communicate with the lower fluid chamber C3, are formed in the lower plate 155 of the orifice plate 151.

Consequently, fluids may flow between the upper fluid chamber C1 and C2, the orifices 157 and 158, and the lower fluid chamber C3 through the fluid passage holes 152a and 155a (see FIG. 4) formed in the upper plate 152 and the lower plate 155 of the orifice plate 151.

In one form of the present disclosure, the partition wall 131 for partitioning the upper fluid chamber into two fluid chambers C1 and C2 is further formed at the main rubber 130.

In some forms of the form of the present disclosure, the partitioned upper fluid chamber C1 and C2 is a space between the main rubber 130 and the orifice assembly 150, specifically a space defined by the main rubber 130 and the orifice plate 151 of the orifice assembly 150, and more specifically a space defined by the lower surface of the main rubber 130 and the upper plate 152 of the orifice plate 151.

In some forms of the present disclosure, the partition wall 131 of the main rubber 130 is formed in a shape extending downwards from the middle of the lower surface of the main rubber defining the upper fluid chamber, and the upper fluid chamber is partitioned into two fluid chambers C1 and C2 by the partition wall 131 in the state in which the lower end of the partition wall 131 is coupled to the orifice assembly 150.

At this time, the lower end of the partition wall 131 is coupled to the upper plate 152 of the orifice plate 151 of the orifice assembly 150, and in this state the upper fluid chamber is partitioned into two fluid chambers C1 and C2 by the partition wall 131.

In another form of the present disclosure, the partition wall 131 partitions the upper fluid chamber into a first upper fluid chamber C1 located at the front of a vehicle in the direction of a chassis of the vehicle and a second upper fluid chamber C2 located at the rear of the vehicle in the direction of the vehicle body.

In other form, the first upper fluid chamber C1 and the second upper fluid chamber C2 are fluid chambers partitioned by the partition wall 131, and the first upper fluid chamber C1 and the second upper fluid chamber C2 are hermetically sealed spaces surrounded by the lower surface of the main rubber 130 and the upper plate 152 of the orifice plate 151.

In some forms of the present disclosure, the first upper fluid chamber C1 is a front fluid chamber defined by the lower surface of the main rubber 130 and the upper plate 152 of the orifice plate 151, and the second upper fluid chamber C2 is a rear fluid chamber defined by the lower surface of the main rubber 130 and the upper plate 152 of the orifice plate 151.

In addition, the first upper fluid chamber C1 and the second upper fluid chamber C2 are fluid chambers defined by the partition wall 131 of the main rubber 130.

In one form, the mount 100 has a first front upper fluid chamber C1, defined by the main rubber 130 and the orifice assembly 150, a second rear upper fluid chamber C2, defined by the main rubber 130 and the orifice assembly 150, and a lower fluid chamber C3, located at the lower side of the two upper fluid chambers C1 and C2 and defined by the orifice assembly 150 and the diaphragm 160, each of which is filled with a fluid.

At this time, the first upper fluid chamber C1 and the second upper fluid chamber C2, which are partitioned in the forward-rearward direction, do not communicate with each other, whereby no fluid can flow therebetween.

In one form, the first upper fluid chamber C1 and the lower fluid chamber C3 communicate with each other, and the second upper fluid chamber C2 and the lower fluid chamber C3 communicate with each other, through the orifices 157 and 158 in the orifice assembly 150 such that fluids can flow only between the first upper fluid chamber C1 and the lower fluid chamber C3 and between the second upper fluid chamber C2 and the lower fluid chamber C3.

To this end, two fluid passage holes 152a allowing fluids to flow between the first upper fluid chamber C1 and the lower fluid chamber C3 and between the second upper fluid chamber C2 and the lower fluid chamber C3 are formed in the upper plate 152 of the orifice plate 151, and two fluid passage holes 155a are also formed in the lower plate 155 of the orifice plate 151 in the same manner.

In one form, the fluids flow between the first upper fluid chamber C1 and the lower fluid chamber C3 and between the second upper fluid chamber C2 and the lower fluid chamber C3 through the individual orifices 157 and 158 in the orifice assembly 150, whereby the mount 100 exhibits both forward-rearward damping performance and upward-downward damping performance.

Figure 2:
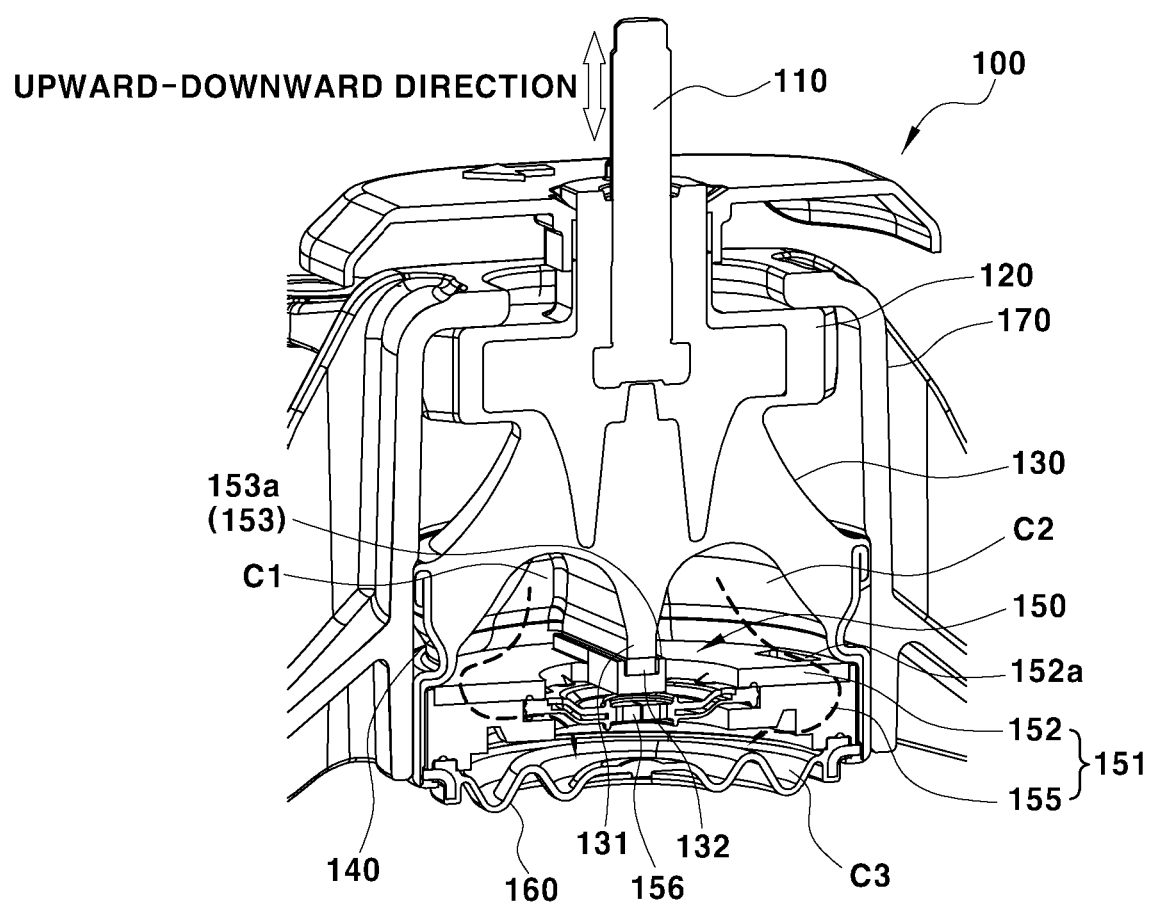
FIG. 2 is a sectional view showing the operation state of the mount in one form of the present disclosure at the time of upward-downward damping.
Figure 3:
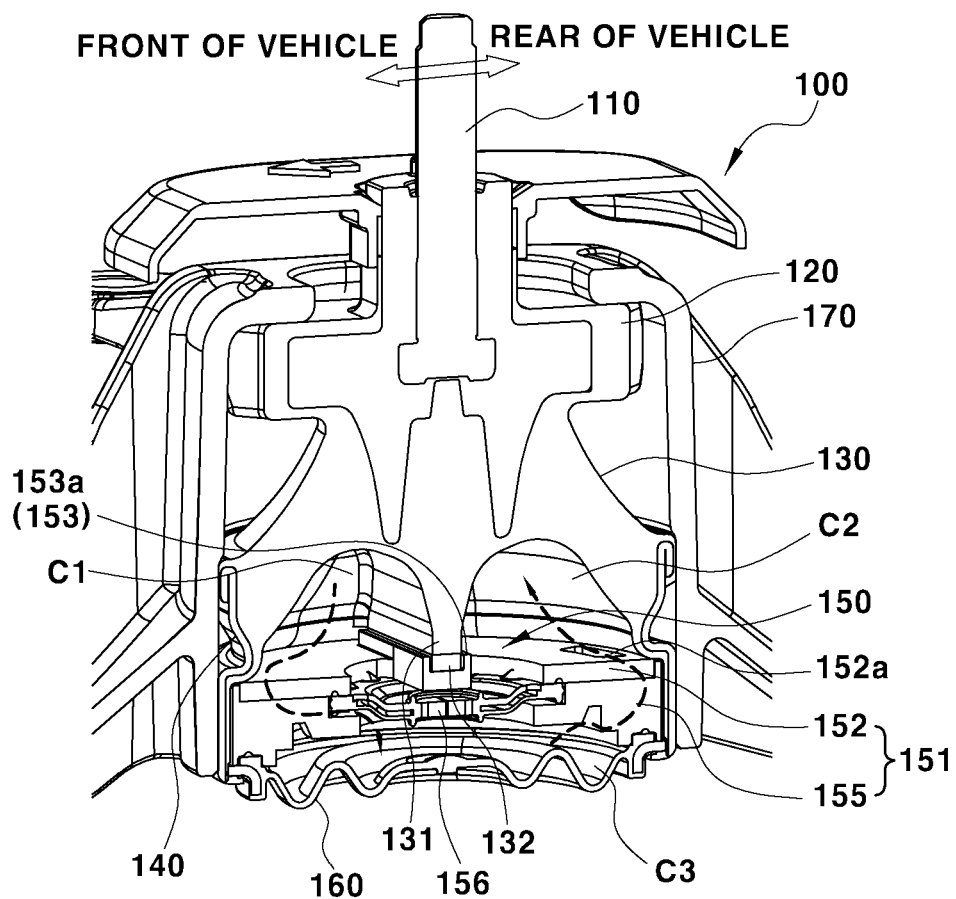
FIG. 3 is a sectional view showing the operation state of the mount in one form of the present disclosure at the time of forward-rearward damping.

FIG. 2 is a sectional view showing the operation state of the mount at the time of upward-downward damping, and FIG. 3 is a sectional view showing the operation state of the mount at the time of forward-rearward damping, wherein routes along which fluids flow are indicated by arrows.

At the time of upward-downward damping of the mount 100 according to one form of the present disclosure, as shown in FIG. 2, both the first upper fluid chamber C1 and the second upper fluid chamber C2 are compressed such that some of the fluids filling the first upper fluid chamber C1 and the second upper fluid chamber C2 flow to the lower fluid chamber C3 through the individual orifices 157 and 158 in the orifice assembly 150, whereby damping is achieved, although there is no difference from the conventional mount.

That is, some of the fluid flows from the first upper fluid chamber C1 to the lower fluid chamber C3 through the first orifice 157, and some of the fluid flows from the second upper fluid chamber C2 to the lower fluid chamber C3 through the second orifice 158, whereby damping is achieved.

In addition, the engine (not shown) and the center bolt 110 connected thereto move forwards or rearwards, whereby forward-rearward damping is achieved. When forward force is applied to the center bolt 1100 in the mount 100, the first upper fluid chamber C1, which is located at the front, is compressed, whereby the fluid is discharged from the first upper fluid chamber C1 to the lower fluid chamber C3 through the first orifice 157, and the fluid is introduced from the lower fluid chamber C3 into the second upper fluid chamber C2, which is located at the rear, through the second orifice 158, whereby the second upper fluid chamber C2 is expanded. When rearward force is applied to the center bolt 1100 in the mount 100, on the other hand, the second upper fluid chamber C2, which is located at the rear, is compressed, whereby the fluid is discharged from the second upper fluid chamber C2 to the lower fluid chamber C3 through the second orifice 158, and the fluid is introduced from the lower fluid chamber C3 into the first upper fluid chamber C1, which is located at the front, through the first orifice 157, whereby the first upper fluid chamber C1 is expanded.

In brief, at the time of forward damping of the mount 100, the first upper fluid chamber C1 is compressed, whereby some of the fluid filling the first upper fluid chamber C1 flows to the lower fluid chamber C3 through the first orifice 157 of the orifice assembly 150, and at this time some of the fluid filling the lower fluid chamber C3 flows to the second upper fluid chamber C2 through the second orifice 158 to expand the second upper fluid chamber C2, whereby damping is achieved.

In addition, at the time of rearward damping of the mount 100, the second upper fluid chamber C2 is compressed, whereby some of the fluid filling the second upper fluid chamber C2 flows to the lower fluid chamber C3 through the second orifice 158 of the orifice assembly 150, and at this time some of the fluid filling the lower fluid chamber C3 flows to the first upper fluid chamber C1 through the first orifice 157 to expand the first upper fluid chamber C1, whereby damping is achieved.

Figure 4:
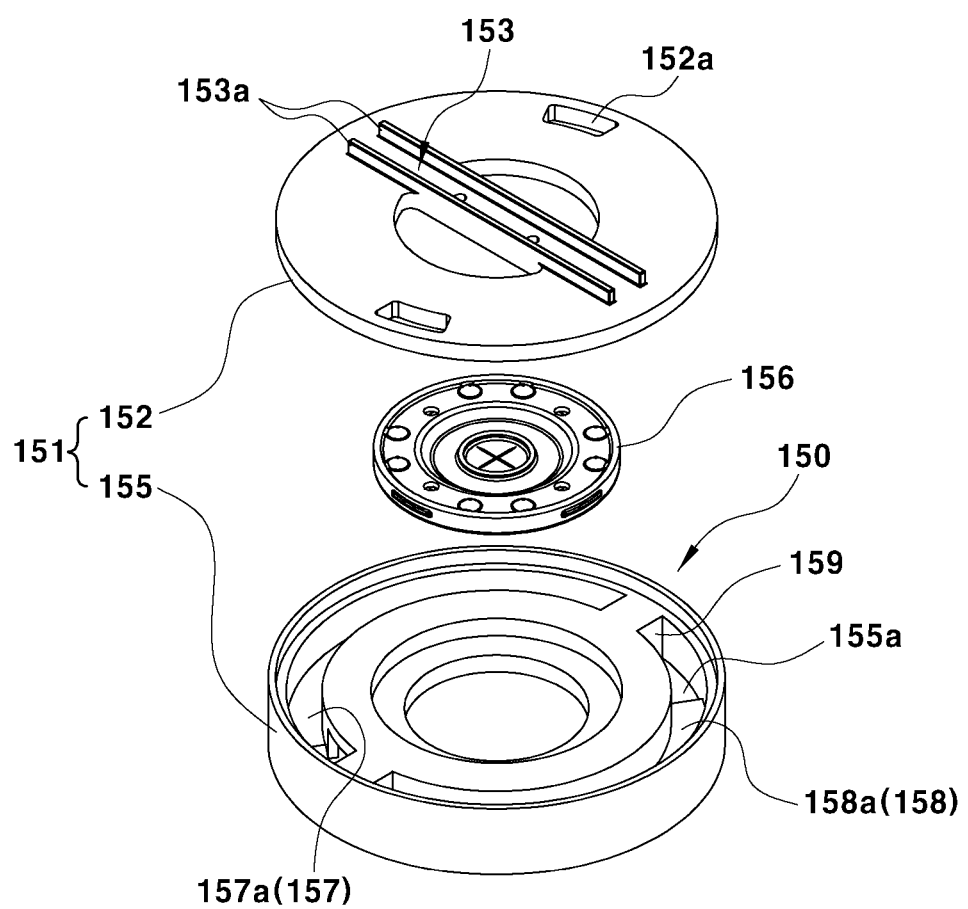
FIG. 4 is an exploded perspective view showing the construction of an orifice assembly in the mount in one form of the present disclosure.

FIG. 4 is an exploded perspective view showing the construction of the orifice assembly of the mount according to another form of the present disclosure. As shown, the orifice assembly 150 includes an upper plate 152, a lower plate 155, and a membrane 156.

Two channel grooves 157a and 158a, each of which is formed in the shape of a groove having an inner passage and the inner passages of which are separated from each other by two opposite walls 159, are formed in the lower plate 155 so as to be disposed in a ring shape. A fluid passage hole 155a is formed in each of the channel grooves 157a and 158a.

In addition, the membrane 156 is accommodated so as to be located between the upper plate 152 and the lower plate 155, and the upper plate 152 and the lower plate 155 are integrally coupled to each other in the state in which the membrane 156 is accommodated, whereby the upper plate 152 is disposed so as to cover the two channel grooves 157a and 158a from above.

As a result, the respective channel grooves 157a and 158a of the lower plate 155 and the upper plate 152, which covers the upper side of the lower plate, define orifices 157 and 158, which are hermetically sealed fluid channels in the orifice assembly 150.

In one form of the present disclosure, the orifices 157 and 158, which are disposed so as to extend in a ring shape, are provided in the orifice assembly 150, and the orifices 157 and 158 are partitioned from each other by the walls 159.

That is, a ring-shaped orifice is partitioned into two sub-orifices (a first orifice and a second orifice) 157 and 158, which are individual fluid passages that are separated from each other, by the walls 159. At this time, each of the sub-orifices 157 and 158 may have a shape obtained by equally dividing a ring-shaped passage into semicircular long passages.

In addition, fluid passage holes 152a are formed in the upper plate 152 so as to correspond to the channel grooves 157a and 158a. As a result, the upper plate 152 has the two fluid passage holes 152a, and the lower plate 155 has the two fluid passage holes 155a.

Figure 5:
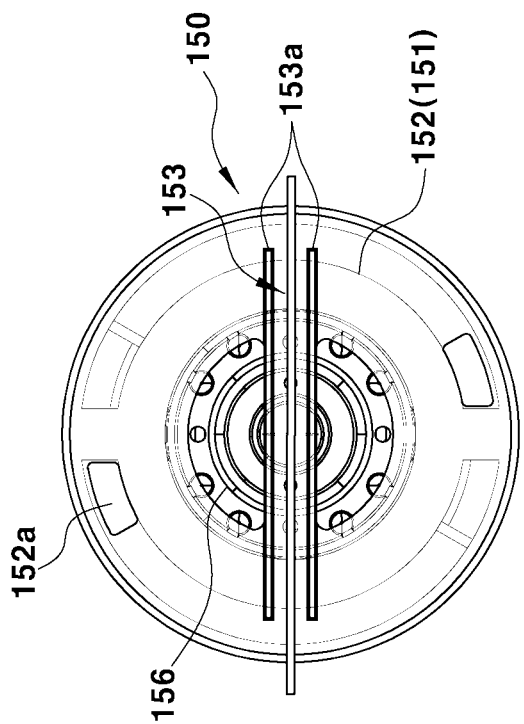
FIG. 5 is a plan view showing the orifice assembly in the mount in one form of the present disclosure.

FIG. 5 is a plan view showing the orifice assembly of the mount according to one form the form of the present disclosure, wherein the state in which two fluid passage holes 152a for allowing fluids to flow between the orifices and the fluid chamber are formed in the upper plate 152 of the orifice assembly is shown.

In addition, a coupling unit 153, formed at the upper surface 152 of the orifice assembly 150 such that the lower end of the partition wall 131 of the main rubber 130 is coupled thereto, is shown in FIGS. 4 and 5. As illustrated, the coupling unit 153 is formed at the upper surface of the upper plate 152, which has a disk shape, so as to extend through the center of a circle of the upper plate in a diametrical direction.

At this time, the lower end of the partition wall 131 may also extend through the center of the circle of the upper plate 152 in the diametrical direction so as to be coupled to the coupling unit 153 of the upper plate 152.

In other form of the present disclosure, the coupling unit 153 may include two elongated protrusions 153a formed at the upper surface of the upper plate 152 so as to be disposed in parallel.

Referring to FIGS. 4 and 5, it can be seen that the upper plate 152 is provided in opposite sides thereof with fluid passage holes 152a, between which the coupling unit 153, to which the partition wall 131 of the main rubber 130 is coupled, are disposed.

The partition wall 131 of the upper main rubber 130 is inserted and coupled into the coupling unit 153, i.e. between the two protrusions 153a. At this time, the lower end of the partition wall 131 may be coupled to the portion of the upper plate inside the coupling unit between the two protrusions 153a so as to be integrally fixed thereto, or may be inserted between the two protrusions 153a due to upward-downward compression of the main rubber 130, rather than being integrally fixed thereto, so as to contact the portion of the upper plate inside the coupling unit.

Figure 6:
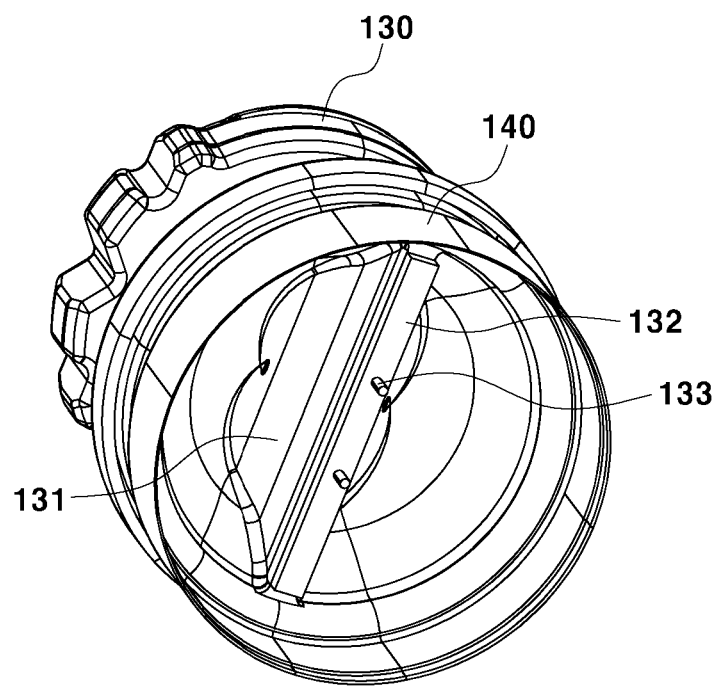
FIGS. 6 and 7 are perspective views showing a means for fixedly coupling a partition wall and an upper plate of the orifice assembly to each other in the mount in one form of the present disclosure.
Figure 7:
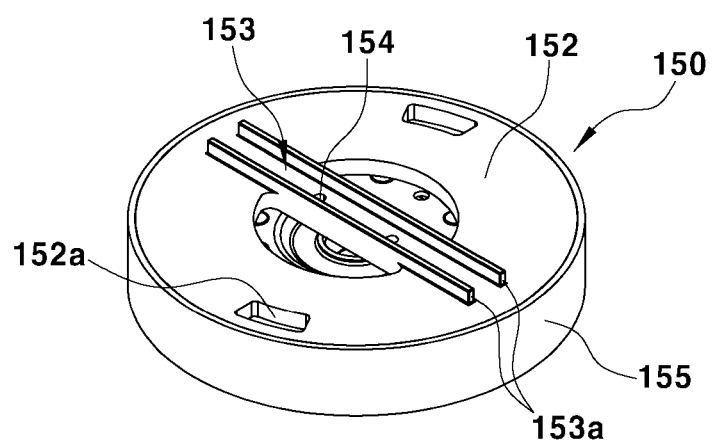

FIGS. 1 to 3 show that the lower end of the partition wall 131 is inserted and coupled into the coupling unit 153 between the two protrusions 153a so as to be integrally fixed to the upper plate portion inside the coupling unit, and FIGS. 6 and 7 illustrate a fixed coupling means.

FIG. 6 is a bottom perspective view of the main rubber 130, and FIG. 7 is a top perspective view of the orifice assembly 150.

As shown, a fastening member 132 is integrally mounted to the lower end of the partition wall 131, which is formed so as to partition the first upper fluid chamber C1 (see FIG. 1) and the second upper fluid chamber C2 (see FIG. 1) from each other, and a rivet pin 133 is integrally provided at the fastening member 132.

In one form of the present disclosure, the entirety of the fastening member 132 may be made of an aluminum alloy, including the rivet pin 133.

The fastening member 132 may be integrally fixed to the lower end of the partition wall 131 when forming the main rubber 130, or may be fixed to the lower end of the partition wall 131 through a separate joining process after forming the main rubber 130.

When the fastening member 132 is integrally fixed to the lower end of the partition wall 131 of the main rubber 130, the rivet pin 133 protrudes downwards. The fastening member 132 may have a plurality of rivet pins 133.

Referring to FIG. 6, the fastening member 132 has two rivet pins 133. However, the present disclosure is not limited thereto. In the fastening member 132, the number of rivet pins 133 may be changed.

As shown in FIG. 7, rivet holes 154 are formed through the portion of the upper plate 152 of the orifice plate 151 between the two protrusions 153a, which constitute the coupling unit 153, so as to correspond to the rivet pins.

When riveting is performed after the rivet pins 133 of the partition wall 131 are inserted through the rivet holes 154 of the upper plate 152, therefore, the partition wall 131 of the main rubber 130 and the upper plate 152 of the orifice assembly 150 may be integrally coupled to each other.

As described above, the partition wall 131 of the main rubber 130 and the upper plate 152 of the orifice assembly 150 are coupled to each other by riveting, which, however, is illustrative, and the present disclosure is not limited thereto. Any method capable of integrally fixing the lower end of the partition wall 131 to the coupling unit 153 of the upper plate 152 may be used without limitation.

In the case in which the partition wall 131 of the main rubber 130 and the upper plate 152 of the orifice assembly 150 are integrally coupled to each other, the first upper fluid chamber C1, which is the front fluid chamber, and the second upper fluid chamber C2, which is the rear fluid chamber, are completely isolated from each other, whereby loss factors in the upward-downward direction and the forward-rearward direction increase.

Figure 8:
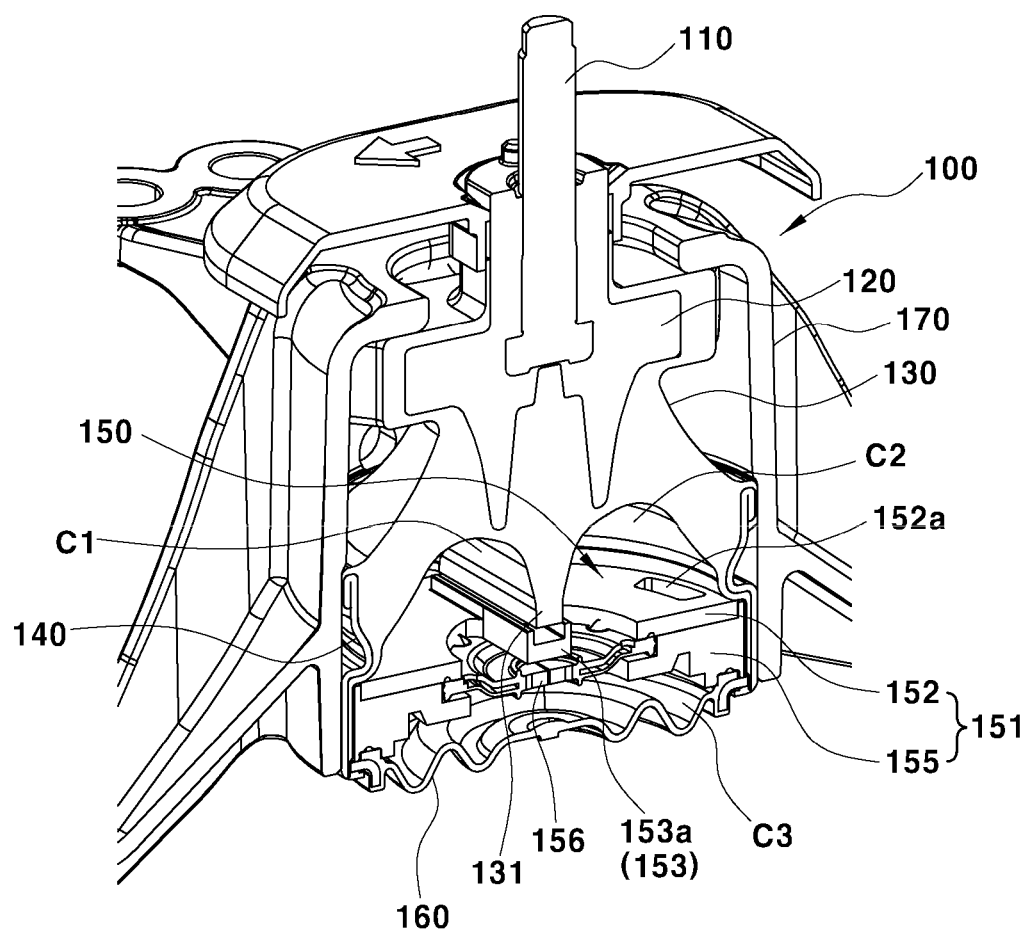
FIG. 8 is a sectional perspective view showing a mount according to another form of the present disclosure.
Figure 9:
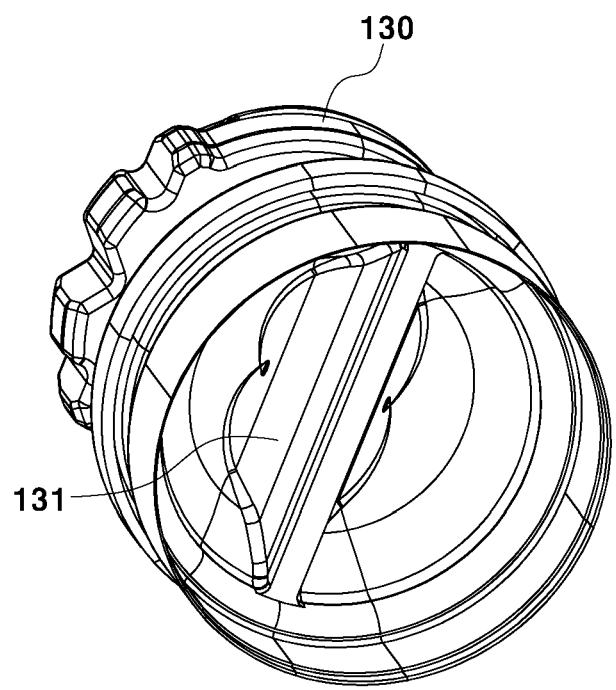
FIGS. 9 and 10 are perspective views showing a partition wall of a main rubber and a coupling unit of an orifice assembly in the mount according to the form shown in FIG. 8.
Figure 10:
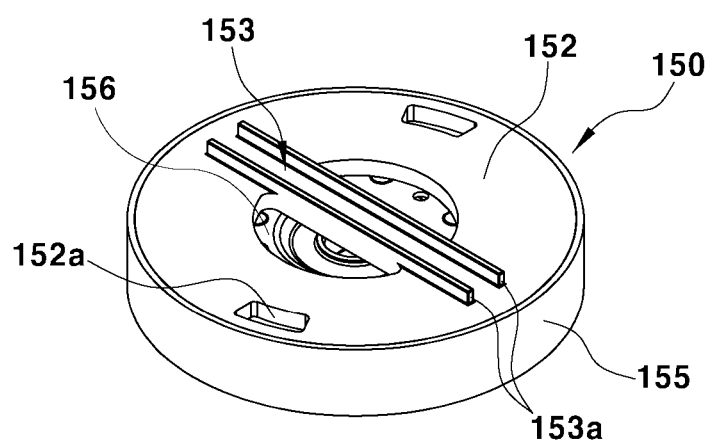

FIGS. 8, 9, and 10 show that the partition wall 131 is not integrally fixed to the coupling unit 153 of the upper plate 152, but the lower end of the partition wall 131 is inserted into the coupling unit 153 between the two protrusions 153a due to upward-downward compression of the main rubber 130.

FIG. 8 is a sectional perspective view of the mount, FIG. 9 is a bottom perspective view of the main rubber, and FIG. 10 is a top perspective view of the orifice assembly.

As shown, the lower end of the partition wall 131 has a shape capable of being inserted into a space between the two protrusions 153a constituting the coupling unit 153 of the upper plate 152. When a powertrain including an engine is mounted to a chassis of the vehicle, the main rubber 130 is pushed and compressed downwards due to the weight of the engine. At this time, the surface of the lower end of the partition wall 131 is inserted between the two protrusions 153a and thus contacts the surface of the upper plate 152.

That is, the lower end of the partition wall 131 is moved downwards and is inserted between the two protrusions 153a by force pushing the main rubber 130 downwards. Subsequently, the main rubber 130 is compressed by the force pushing the main rubber 130, whereby the lower end of the partition wall 131 comes into tight contact with the surface of the portion of the upper plate 152 inside the coupling unit 153. Consequently, the first upper fluid chamber C1 and the second upper fluid chamber C2 are completely separated from each other due to compression of the main rubber 130 and the partition wall 131 and tight contact between the partition wall 131 and the portion of the upper plate 152.

In this case, durability is higher while the main rubber and the orifice assembly are more simply assembled than the integral fixing scheme of FIGS. 6 and 7.

Since the lower end of the partition wall 131 is not integrally fixed to the portion of the upper plate in the coupling unit 153 (the portion of the upper plate between the two protrusions), however, the lower end of the partition wall 131 and the portion of the upper plate in the coupling unit 153 may be separated from each other, whereby the first upper fluid chamber C1 and the second upper fluid chamber C2 may not be completely separated from each other. As a result, loss factors may be slightly lower than the integral fixing scheme of FIGS. 6 and 7.

Figure 11:
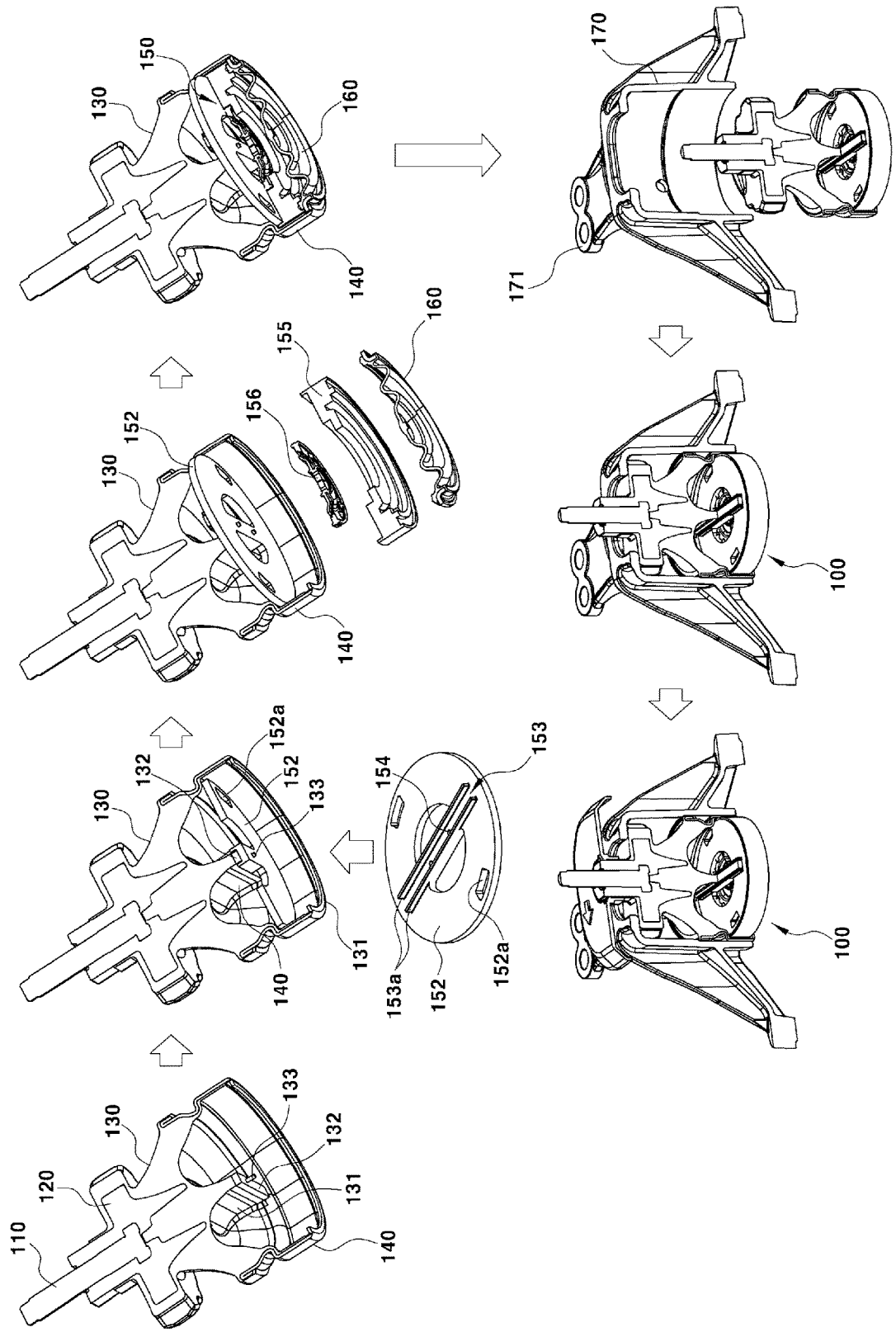
FIG. 11 are sectional perspective views sequentially showing a process of assembling the mount according to the form shown in FIGS. 6 and 7.

FIG. 11 are sectional perspective views sequentially showing a process of assembling the mount 100 in one form of the present disclosure. Here, the lower end of the partition wall 131 is integrally fixed to the coupling unit 153 of the upper plate 152.

As shown, the inner core 120, to which the center bolt 110 is coupled, the outer pipe 140, and the fastening member 132 are integrally coupled to the main rubber 130, and the upper plate 152 of the orifice assembly 150 is coupled to the outer pipe 140 first.

At this time, the partition wall 131 of the main rubber 130 and the upper plate 152 of the orifice assembly 150 are assembled so as to be fixed to each other. The fastening member 132, which defines the lower end of the partition wall 131, is inserted and coupled between the two protrusions 153a constituting the coupling unit 153 of the upper plate 152.

When the fastening member 132 is inserted and coupled into the coupling unit 153, as described above, the rivet pins 133 are inserted through the corresponding rivet holes 154 of the upper plate 152 in the state in which the lower surface of the fastening member 132 is joined to the surface of the portion of the upper plate inside the coupling unit 153 (i.e. the surface of the portion of the upper plate between the two protrusions).

When the rivet pins 133 are inserted through the corresponding rivet holes 154 and the lower ends of the rivet pins 133 exposed downwards from the upper plate 152 are riveted in the state in which the fastening member 132 and the portion of the upper plate are joined to each other, as described above, the rivet pins 133 are prevented from being separated from the corresponding rivet holes 154, whereby the lower end of the partition wall 131 and the fastening member 132 are integrally fixed to the upper plate 152.

Subsequently, the membrane 156, the lower plate 155, and the diaphragm 160 are assembled to the lower side of the upper plate 152 in order, and the lower end of the outer pipe 140 is curled so as to be integrally coupled to the edge of the diaphragm 160 in the circumferential direction thereof, whereby the main rubber 130 and the orifice assembly 150 are integrally coupled to each other.

Subsequently, the main rubber 130 and the orifice assembly 150 are inserted and assembled into a housing 170 having a support bracket 171 integrally formed therewith, and then other components are further assembled to complete the mount 100.

Figure 12:
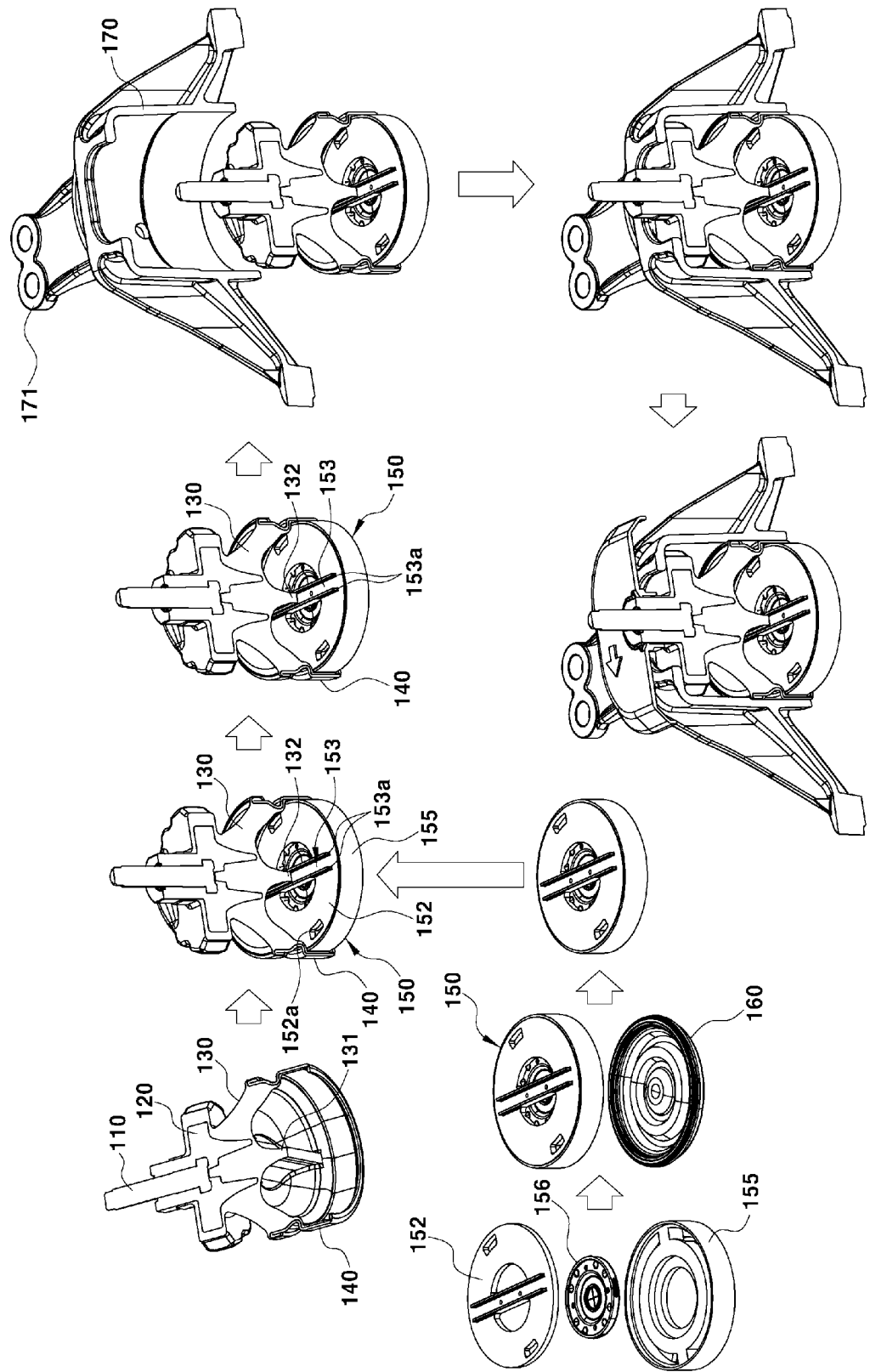
FIG. 12 are sectional perspective views sequentially showing a process of assembling the mount according to the form shown in FIGS. 8 to 10.

Meanwhile, FIG. 12 are sectional perspective views sequentially showing a process of assembling the mount 100 in one form of the present disclosure. Here, the main rubber 130 is pushed downwards, whereby the lower end of the partition wall 131 is joined to the coupling unit 153 of the upper plate 152, as shown in FIGS. 8 to 10.

As shown, the main rubber 130 is formed through a curing process so as to be integrated with the inner core 120, to which the center bolt 110 is coupled, and the outer pipe 140, the upper plate 152, the lower plate, and the membrane 156 are coupled to assemble the orifice assembly 150, and the diaphragm 160 is coupled to the lower side thereof.

Subsequently, the orifice assembly 150 and the diaphragm 160 are inserted and coupled into the outer pipe 140. At this time, the lower end of the partition wall 131 of the main rubber 130 is located at the upper side of the coupling unit 153 of the upper plate 152.

Subsequently, the lower end of the outer pipe 140 is curled so as to be integrally coupled to the edge of the diaphragm 160 in the circumferential direction thereof, whereby the main rubber 130 and the orifice assembly 150 are integrally coupled to each other.

Subsequently, the main rubber 130 and the orifice assembly 150 are inserted and assembled into the housing 170 having the support bracket 171 integrally formed therewith, and then other components are further assembled to complete the mount 100, in the same manner as in the form of FIG. 11.

The hydraulic mount according to the exemplary forms of present disclosure as described above has the following advantages.

A conventional conical hydraulic mount has a structure exhibiting only upward-downward damping performance; however, the hydraulic mount according to the present disclosure is capable of performing both forward-rearward damping and upward-downward damping, and satisfies both NHV (noise, vibration, and harshness) performance and R&H performance, which conflict with each other, in an inertial support type system.

That is, the hydraulic mount according to the present disclosure is capable of satisfying both a traveling vibration (bounce mode) problem and an NHV (roll mode) problem.

In addition, a conventional mount capable of performing both forward-rearward damping and upward-downward damping includes two orifice assembles and four fluid chambers. However, the mount 100 in the exemplary forms of the present disclosure includes a single orifice assembly 150 and three fluid chambers C1, C2, and C3, whereby the mount is simpler in structure and construction than the conventional mount. Consequently, the mount is advantageous in terms of cost and weight, and the system becomes robust (the system is trouble-free).

In addition, a radial (X-shaped) main rubber is used in the conventional mount. In this case, however, forward-rearward characteristics of the main rubber increase, whereby an insulation rate is deteriorated.

In one form, the mount 100 has the upper fluid chamber which is partitioned into two fluid chambers C1 and C2 by the partition wall 131 formed at the main rubber 130, whereby it is possible to perform both forward-rearward damping and upward-downward damping while the conical shape of the mount is maintained. Thus, it is possible to increase or maximize an insulation rate in the forward-rearward direction through a simple structure, and NVH performance is also high.

In addition, both forward-rearward damping and upward-downward damping may be performed only through simple improvement to the structure, and a free application to a peripheral system is possible without affecting layout of the peripheral system (high extensibility).

As is apparent from the foregoing, the mount according to the present disclosure is capable of realizing both forward-rearward damping performance and upward-downward damping performance using only a single orifice assembly through simple improvement to the internal structure thereof, whereby it is possible to reduce cost and weight, to secure robustness and durability due to simplification of the structure, and to prevent fluid leakage.

In addition, the conventional upper and lower fluid chambers are used without being changed, whereby spatial freedom is high, and it is possible to keep forward-rearward characteristics of the main rubber (insulator) low, whereby it is possible to maintain insulation performance.

The effects of the present disclosure are not limited to those mentioned above. It should be understood that the effects of the present disclosure include all effects that can be inferred from the foregoing description of the present disclosure.

The foregoing describes exemplary forms of the present disclosure. The present disclosure may be used in various different combinations, changes, and environments. That is, variations or modifications can be made within the conceptual scope of the present disclosure, equivalents to the disclosure of the present disclosure, and/or the scope of technology and knowledge in the art to which the present disclosure pertains. Therefore, the above detailed description does not limit the present disclosure disclosed above.

What is claimed is:

1. A hydraulic mount for a vehicle, the hydraulic mount comprising:
   a main rubber configured to define a fluid chamber;
   an orifice assembly configured to:
   partition the fluid chamber into an upper fluid chamber and a lower fluid chamber, define the upper fluid chamber together with the main rubber, and
   have an orifice which is a fluid passage and disposed between the upper fluid chamber and the lower fluid chamber; and
   a diaphragm configured to define the lower fluid chamber on a lower side of the orifice assembly,
   wherein the main rubber has a partition wall extending downwards configured to partition the upper fluid chamber into a first upper fluid chamber and a second upper fluid chamber in a state in which a lower end of the partition wall is coupled to the orifice assembly.

2. The hydraulic mount according to claim 1, wherein the first upper fluid chamber is located at a front of the vehicle in a direction of a chassis of the vehicle, and the second upper fluid chamber is located at a rear of the vehicle in the direction of the chassis.

3. The hydraulic mount according to claim 1, wherein the partition wall of the main rubber is formed in a shape extending downwards from a middle of a lower surface of the main rubber defining the upper fluid chamber such that a lower end of the partition wall is coupled to an upper surface of the orifice assembly.

4. The hydraulic mount according to claim 1, wherein:
   a coupling unit is formed at an upper plate of the orifice assembly and configured to extend in a diametrical direction of the upper plate,
   a lower end of the partition wall of the main rubber is coupled to the coupling unit, and
   the lower end of the partition wall is formed in a shape extending in the diametrical direction of the upper plate so as to be coupled to the coupling unit of the upper plate.

5. The hydraulic mount according to claim 4, wherein the coupling unit comprises two elongated protrusions formed at the upper plate, the two elongated protrusions are disposed in parallel with each other, and
   the lower end of the partition wall is inserted and coupled between the two elongated protrusions.

6. The hydraulic mount according to claim 1, wherein:
   a coupling unit is formed at an upper plate of the orifice assembly,
   a lower end of the partition wall of the main rubber is coupled to the coupling unit,
   the coupling unit comprises two elongated protrusions formed at the upper plate,
   the two elongated protrusions are disposed in parallel with each other, and
   the lower end of the partition wall is inserted and coupled between the two elongated protrusions.

7. The hydraulic mount according to claim 6, wherein:
   a fastening member configured to be inserted between the two elongated protrusions is installed at the lower end of the partition wall,
   a rivet pin formed at the fastening member is riveted in a state of being inserted through a rivet hole formed in the upper plate, and
   the lower end of the partition wall is integrally fixed to the upper plate via the fastening member.

8. The hydraulic mount according to claim 6, wherein:
   the main rubber is pushed downwards by weight of an engine supported by the hydraulic mount, and
   the lower end of the partition wall is coupled to the upper plate in tight contact therewith in a state of being inserted between the two elongated protrusions.

9. The hydraulic mount according to claim 1, wherein the orifice assembly includes:
   a first orifice which is a first fluid passage arranged between the first upper fluid chamber and the lower fluid chamber; and
   a second orifice which is a second fluid passage arranged between the second upper fluid chamber and the lower fluid chamber.

10. The hydraulic mount according to claim 9, wherein:
    the orifice assembly comprises an upper plate and a lower plate which are configured to define the first and second orifices,
    the first orifice and the second orifice are provided between the upper plate and the lower plate, each of the first orifice and the second orifice being semicircular, first fluid passage holes through which the first orifice and the second orifice communicate respectively with the first upper fluid chamber and the second upper fluid chamber are formed in the upper plate, and second fluid passage holes through which the first orifice and the second orifice communicate with the lower fluid chamber are formed in the lower plate.

11. The hydraulic mount according to claim 1, wherein:

a fastening member is installed at a lower end of the partition wall, and a rivet pin formed at the fastening member is riveted in a state of being inserted through a rivet hole formed in an upper plate of the orifice assembly, such that the lower end of the partition wall is integrally fixed to the upper plate via the fastening member.

* * * * *